(12) United States Patent
Kimpe

(10) Patent No.: US 8,456,516 B2
(45) Date of Patent: Jun. 4, 2013

(54) METHODS AND SYSTEMS FOR STEREOSCOPIC IMAGING

(75) Inventor: Tom Kimpe, Ghent (BE)

(73) Assignee: Barco N.V., Kortrijk (BE)

( * ) Notice: Subject to any disclaimer, the term of this patent is extended or adjusted under 35 U.S.C. 154(b) by 989 days.

(21) Appl. No.: 12/216,240

(22) Filed: Jul. 1, 2008

(65) Prior Publication Data

US 2010/0002295 A1 Jan. 7, 2010

(51) Int. Cl.
*H04N 13/00* (2006.01)
(52) U.S. Cl.
USPC .................................. 348/42; 348/51
(58) Field of Classification Search
None
See application file for complete search history.

(56) References Cited

U.S. PATENT DOCUMENTS

| | | | |
|---|---|---|---|
| 7,002,642 B2* | 2/2006 | Jung | 349/15 |
| 7,023,466 B2* | 4/2006 | Favalora et al. | 348/42 |
| 2003/0107712 A1* | 6/2003 | Perlin | 353/31 |
| 2004/0240777 A1 | 12/2004 | Woodgate et al. | |
| 2006/0012542 A1* | 1/2006 | Alden | 345/32 |
| 2007/0133089 A1* | 6/2007 | Lipton et al. | 359/451 |
| 2007/0188667 A1 | 8/2007 | Schwerdtner | |
| 2008/0068372 A1* | 3/2008 | Krah | 345/419 |

OTHER PUBLICATIONS

Seetzen, Helge et al., "54.2: A High Dynamic Range Display Using Low and High Resolution Modulators," SID 03 Digest, 1450-1453, 2003.

* cited by examiner

*Primary Examiner* — Phuoc Nguyen
(74) *Attorney, Agent, or Firm* — Bacon & Thomas, PLLC

(57) ABSTRACT

A stereoscopic imaging system is described for generating a stereoscopic image of a scene. The stereoscopic imaging system is adapted for generating at least one sub-image for a first eye and at least one sub-image for a second eye whereby the at least one sub-image for the first eye and at least one sub-image for the second eye adapted for combining into the stereoscopic image. The image data for producing at least one of the sub-images for the first eye and/or for the second eye is generated based on a combination of the basic image data for the first eye and the basic image data for the second eye. The basic image data for the first eye thereby is the image information received by the first eye when the scene is seen by the first eye only and the basic image data for the second eye thereby is the image information received by the second eye when the scene is seen by the second eye only. The present invention also relates to a corresponding method, an image data processor, a controller, an obscuration means and parts of the imaging hardware.

15 Claims, 4 Drawing Sheets

METHODS AND SYSTEMS FOR STEREOSCOPIC IMAGING

TECHNICAL FIELD OF THE INVENTION

The present invention relates to field of displaying. More particularly, the present invention relates to the field of stereoscopic displaying, e.g. time sequential and/or spatial multiplexed stereoscopic displaying, methods for controlling stereoscopic displaying and corresponding controllers.

BACKGROUND OF THE INVENTION

Humans and many animals have binocular vision provided by two eyes which look in the same direction. Two parallel aligned but spaced eyes deliver two slightly different images of the same scene. This is due to the 4 to 6 cm separation between the eyes, which makes each eye have a slightly different viewpoint. The images from these two different viewpoints are sent to the brain, and this difference, which is termed parallax, is interpreted as depth. The nearer an object is to the eyes, the greater the difference between the two images. From the difference between the two images, the brain can display an impression of depth.

Stereoscopic image displays, such as stereoscopic projection for example, are based on the same principle: two slightly different images, one for the left eye and one for the right eye, are displayed by some means, e.g. projected onto a screen. A corresponding image modulating system enables the left eye to see only the left eye image, and the right eye to see only the right eye image.

In international patent application WO 2005/060270 an autostereoscopic system is described wherein for forming stereoscopic images for a plurality of users, the position of the users is taking into account. The generated stereoscopic images are generated as function of position of the user, e.g. determined with a tracking system, and images are generated such that expanded sweet spots are generated visible to various eye positions of viewers observing alternating images or a stereoscopic image sequence.

In US patent application 2004/0240777 A1 a plurality of stereoscopic imaging systems are described, wherein the system is adapted to be switchable between a two dimensional mode and an autostereoscopic three dimensional mode or to provide a multi-user display device whereby different images are displayed to different viewers.

A disadvantage of current stereoscopic imaging systems that the brightness intensity at which the images can be projected or displayed is still relatively low.

SUMMARY OF THE INVENTION

It is an object of the present invention to provide good apparatus or methods for providing stereoscopic images. It is an advantage of embodiments according to the present invention that methods and system for generating stereoscopic images are provided that can display stereoscopic images with high brightness. The brightness enhancement can be up to 100% compared to conventional stereoscopic displaying technique, whereby half of the time the image for the left eye is displayed and half of the time the image intended for the right eye is displayed. Some embodiments may e.g. provide a brightness gain of 33%. It is an advantage of some embodiments according to the present invention that the brightness enhancement can be obtained by a mere change in driving scheme. It is an advantage of some embodiments according to the present invention that the brightness enhancement can be obtained by a change in driving scheme combined with a hardware modification compared to standard stereoscopic techniques that is easy to implement.

It is an advantage of embodiments according to the present invention that methods and systems for generating stereoscopic images are provided allowing to limit flickering in the images produced.

The above objective is accomplished by a method and device according to the present invention.

The present invention relates to a stereoscopic imaging system for generating a stereoscopic image of a scene, the stereoscopic imaging system adapted for generating at least one sub-image for a first eye, at least one sub-image for a second eye and at least one common sub-image for said first eye and said second eye, said at least one sub-image for the first eye, at least one sub-image for the second eye and at least one sub-image for both eyes being adapted for combining into the stereoscopic image, wherein the system comprises an image data processor for generating image data for producing at least one of said sub-images for the first eye and/or for the second eye based on a combination of the basic image data for the first eye and the basic image data for the second eye, wherein the image data is adapted for imaging at least one sub-image to both the first eye and the second eye simultaneously, the basic image data for the first eye being the image information received by the first eye when the scene is seen by the first eye only and the basic image data for the second eye being the image information received by the second eye when the scene is seen by the second eye only.

It is an advantage of embodiments according to the present invention that stereoscopic images can be generated and/or projected with a high brightness. Image date for producing at least one of said sub-images for the first eye and/or for the second eye may be image data for producing at least one sub-image for the first eye, image data for producing at least one sub-image for the second eye or image data for producing at least one sub-image for the first eye and image data for producing at least one sub-image for the second eye.

The first eye and the second eye may correspond with the left eye and the second eye of a two-vision system. Alternatively, the first eye and the second eye may be different views of a multi view stereoscopic display system.

The stereoscopic image may be generated based on a plurality of image frames to be imaged, each of said image frames being imaged to at least one of the first eye and/or the second eye, wherein at least one of said plurality of image frames may comprise both basic image data for the first eye and basic image data for the second eye for generating said at least one sub-image based on the combination of substantially the basic image data for the first eye and substantially the basic image data for the second eye. It is an advantage of embodiments according to the present invention that the obtained brightness can be substantially increased, without requiring brighter pixels or light sources. It is an advantage of some embodiments according o the present invention that flicker can be reduced.

Each of said plurality of frames may comprise a combination of basic image data for the first eye and basic image data for second eye. It is an advantage of embodiments according to the present invention that the obtained brightness can be increased by 33% or more compared to conventional stereoscopic imaging systems.

The plurality of frames may consist of first frames to be received by the first eye only or the second eye only and second frames based on a combination of basic image data for the first eye and basic image data for the second eye, the first frames and the second frames being imaged alternating. It is an advantage of embodiments according to the present invention that flicker in the stereoscopic images can be low or even avoided.

The stereoscopic imaging system may comprise an image data processor for generating said image data for said at least one sub-image generated based on a combination of the basic image data for the first eye and the basic image data for the second eye. It is an advantage of some embodiments according to the present invention that the device and method can be easily implemented in existing systems, i.e. without requiring different light sources or emitting pixels.

The stereoscopic imaging system may be adapted for imaging at least one of said at least one sub-image, generated based on a combination of the basic image data for the first eye and the basic image data for the second eye, simultaneously to both the first eye and the second eye. It is an advantage that according to embodiments of the present invention existing stereoscopic imaging systems can be easily adapted to result in stereoscopic imaging systems with high brightness. In a plurality of embodiments, these adaptations can be solely software-based adaptations, such as for example changing a driving scheme or driving voltage for a flexible lens, e.g. to disable the lens. Another example thereof is the driving of a directional backlight in a different way. These adaptations may require only a different driving scheme, making the method and system easy to implement in existing systems.

The stereoscopic imaging system may be adapted for generating in time a sequence of different sub-images for first or second eye to combine into the stereoscopic image, said sequence comprising said at least one of said at least one sub-image. It is an advantage of embodiments according to the present invention that they are applicable to time sequential stereoscopy systems.

The stereoscopic imaging system may comprise at least one projector and a filter in the optical path for generating sub-images to combine into the stereoscopic image, the filter adapted for distinctively obtaining first light with a first characteristic for generating at least one sub-image for the first eye and for distinctively obtaining second light with a second characteristic, different from the first characteristic, for generating at least one sub-image for the second eye, the filter furthermore being adapted for distinctively obtaining third light for generating said least one of said at least one sub-image to be received by both the first eye and the second eye simultaneously.

The first light with a first characteristic can be obtained using a first filter portion of the filter in the light path. The second light with a second characteristic can be obtained using a second filter portion of the filter in the light path. One of the first light or the second light may be generated by the absence of a filter portion in the light path. The first light and second light may be discriminated by means of an adjusted obscuration device. The third light may be not discriminatable by the obscuration device. The adjusted obscuration system may be a pair of glasses, allowing to transmit the first light with the first characteristic for the first eye, the second light with the second characteristic for the second eye and the third light for both eyes. The third light may comprise both light comprising the first characteristic and light comprising the second characteristic. Such a filter, e.g. filter wheel, may comprise three filter positions, i.e. one horizontal polarization filter, one vertical polarization filter and one empty position or position containing a neutral density filter that does not influence polarization. Alternatively, the third light may comprise a third characteristic different from the first and second characteristic to be received by both first and second eye.

The first and second characteristics may be one of colour characteristics, amplitude characteristics or polarisation characteristics. One example thereof is the use of a first filter wherein different colours R1, G1, B1 and R3, G3 and B3 are transmitted while other colours are blocked, whereas in a second filter different colours R2, G2, B2 and R3, G3 and B3. Ri, Gi and Bi thereby represent light of a certain distinctive wavelength. It is an advantage of embodiments according to the present invention that the principle is widely applicable to various stereoscopic systems.

The stereoscopy system may comprise active shutters, the active shutters adapted for selectively passing at least one sub-image to the first eye or second eye, and for passing simultaneously to both the first eye and the second eye said at least one sub-image to be received by the first eye and second eye simultaneously. The active shutters may be incorporated in an obscuration means whereby an active shutter is present for the first eye and an active shutter is present for the second eye.

The stereoscopy system may comprise a backlight, an array of beam splitters for directing light from said backlight in first directions and second, different, directions and a modulating panel for selectively transmitting or blocking the directed light. The backlight, array of beam splitters and modulating panel may be synchronised to sequentially generate a sub-image directed to the first eye and a sub-image directed to the second eye. The backlight, array of beam splitters and modulating panel furthermore may be synchronised to generate the at least one sub-image to be received by both the first eye and the second eye simultaneously and to direct it to both the first eye and the second eye simultaneously.

The stereoscopic imaging system may be adapted for spatially distinctive generating a plurality of sub-images for first eye or second eye to combine into the stereoscopic image, said plurality of sub-images comprising at least one sub-image to be received by both said first eye and said second eye simultaneously. It is an advantage of embodiments according to the present invention that they are applicable to spatially multiplexed stereoscopy systems such as e.g. lenticular stereoscopy systems, dual projector stereoscopy systems, etc.

The stereoscopic imaging system may comprise a display panel and a lenticular mask, the lenticular mask being adapted for receiving light from the display panel and for spatially distinctive obtaining first light to be received only by the first eye, second light to be received only by the second eye and third light to be received by both the first eye and the second eye. It is an advantage of embodiments according to the present invention that lenticular stereoscopic can be obtained with high brightness, e.g. with a brightness being 33% larger than the brightness obtained with conventional stereoscopic imaging systems. The lenticular mask comprises a first set of lenses for imaging onto the first eye, a second set of lenses for imaging onto the second eye and a third set of lenses for imaging onto both the first eye and the second eye. The third set of lenses thereby is optional as providing no lens allows obtaining a pattern that is typically close to a lambertian distribution and thus suitable for displaying sub-images to both eyes. The system thus may comprise at least one additional channel having a field of view that is joint for first and second eye. The lenticular mask comprises a plurality of settable lenses. The settable lenses may be lenses that comprise switchable focussing conditions. The settable lenses may be fluid lenses. The settable lenses may be made of electro-refractive materials and settable by applying an electromagnetic field. The settable lenses may be fluid lenses.

The combination of substantially the basic image data for the first eye and substantially the basic image for the second eye is selected as function of the unintentional cross-talk obtained in a sub-image generated based on only said basic image data for the first eye and/or the unintentional cross-talk obtained in a sub-image generated based on only said basic image data for the second eye.

The present invention also relates to an image processor for generating image data for obtaining at least one stereoscopic image, wherein the image processor is adapted for generating image data for at least one sub-image of a sequence of sub-images for generating a stereoscopic image based on a combination of the basic image data for the first eye and the basic image data for the second eye, wherein the image data is adapted for imaging at least one sub-image to both the first eye and the second eye simultaneously, the basic image data for the first eye thereby is the image information corresponding with the image received by the first eye when the scene is seen by the first eye only and the basic image data for the second eye being the image information corresponding with the image received by the second eye when the scene is seen by the second eye only.

The present invention furthermore relates to an obscuration means for use with a stereoscopic imaging system as described above, the obscuration means being adapted for selectively blocking sub-images for forming part of a stereoscopic image for one eye while transmitting it for the other and furthermore for selectively transmitting other sub-images forming part of the stereoscopic image simultaneously to both eyes.

The present invention also relates to an imaging technique for providing a stereoscopic imaging technique of a scene, the method comprising receiving an image input for a scene to be imaged, calculating image data for sub-images to be displayed to the first eye and/or the second eye, wherein calculating image data for the sub-images comprises producing at least one sub-image for the first eye and/or for the second eye generated based on a combination of the basic image data for the first eye and the basic image data for the second eye, wherein the image data is adapted for imaging at least one sub-image to both the first eye and the second eye simultaneously, the basic image data for the first eye thereby is the image information corresponding with the image received by the first eye when the scene is seen by the first eye only and the basic image data for the second eye being the image information corresponding with the image received by the second eye when the scene is seen by the second eye only.

The method may comprise projecting or imaging at least one sub-image to both the first eye and the second eye simultaneously.

The method may comprise imaging first frames on the first eye only or on second eye only and imaging second frames based on a combination of basic image data for the first eye and basic image data for the second eye, on both the first eye and the second eye simultaneously, the first frames and the second frames being imaged alternating.

The method also may comprise generating in time a sequence of different sub-images for first or second eye to combine into the stereoscopic image, said sequence comprising said at least one of said at least one sub-image.

The method may comprise filtering light in the optical path for generating sub-images to combine into the stereoscopic image, the filtering being for distinctively obtaining first light with a first characteristic for generating at least one sub-image for the first eye and for distinctively obtaining second light with a second characteristic, different from the first characteristic, for generating at least one sub-image for the second eye, wherein the filtering furthermore may comprise filtering for distinctively obtaining third light for generating said least one of said at least one sub-image to be received by both the first eye and the second eye simultaneously.

The method may comprise selectively passing at least one sub-image to the first eye or second eye, and passing simultaneously to both the first eye and the second eye said at least one sub-image to be received by the first eye and second eye simultaneously.

The method may comprise synchronising a backlight, an array of beam splitters and a modulating panel to sequentially generate a sub-image directed to the first eye and a sub-image directed to the second eye, said synchronising being adapted for generating the at least one sub-image to be received by both the first eye and the second eye simultaneously and to direct it to both the first eye and the second eye simultaneously.

The method may comprise spatially distinctive generating a plurality of sub-images for first eye or second eye to combine into the stereoscopic image, said plurality of sub-images comprising at least one sub-image to be received by both said first eye and said second eye simultaneously. The spatially distinctive generating may comprise driving a plurality of settable lenses for directing said sub-images to the first eye only, to the second eye only and to the first and the second eye simultaneously.

The present invention also relates to a controller for controlling the stereoscopic imaging system as described above.

The present invention furthermore relates to a stereoscopic image of a scene obtained with any of the above described systems.

The present invention also relates to a computer program product for executing the method for generating a stereoscopic image as described above. It furthermore relates to a machine readable data storage device storing such a computer program product and/or the transmission of such a computer program product over a local or wide area telecommunications network.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for generating and/or producing stereoscopic images. The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
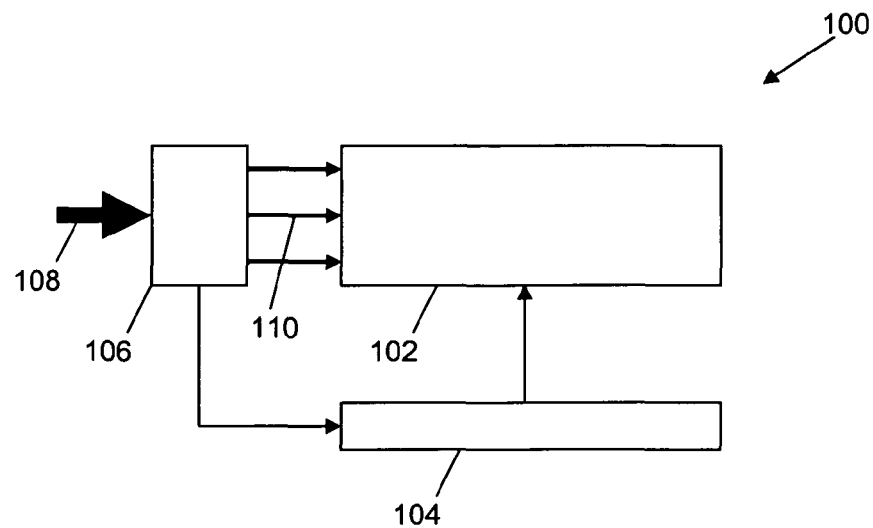
FIG. 1 is a schematic representation of a stereoscopic imaging system for use in embodiments according to the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Furthermore, the particular features, structures or characteristics may be combined in any suitable manner, as would be apparent to one of ordinary skill in the art from this disclosure, in one or more embodiments. The claims following the detailed description are hereby expressly incorporated into this detailed description, with each claim standing on its own as a separate embodiment of this invention. Combinations of features of different embodiments are meant to be within the scope of the invention, and form different embodiments, as would be understood by those in the art. For example, in the following claims, any of the claimed embodiments can be used in any combination.

The following terms are provided solely to aid in the understanding of the invention. With a stereoscopy or stereoscopic imaging there is meant any technique capable of obtaining, generating or providing three-dimensional visual information or generating the illusion of depth in an image. The latter may be performed by presenting a slightly different image to each eye. Stereoscopic imaging may be performed in black and white images, greyscale images and colour images. The present invention is described in particular embodiments and aspects with respect to a left eye and a right eye, the invention includes devices, systems and methods wherein the left eye corresponds to a first eye and the right eye corresponds to a second eye, whereby the first eye and the second eye are representative for a first view and a second view of a multi-view system. Such a multi-view system may be a two-view system, although the invention is not limited thereto. The invention also relates to multi view stereoscopic display systems where there is more than a first, e.g. one left, and a second, e.g. one right, image. For example a 6 view stereo display system will have 3 pairs of left and right images. Advantage is that if the user walks around the display that then also the perception of the object will change, if different image information is generated for the two other L/R pairs. The systems and methods thus may be adapted for adjusting sub-images for two or more "eyes", e.g. views, of the display system. It furthermore is to be noticed that different driving schemes and/or different imaging techniques as e.g. described below, may be used for different views.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Some of the aspects and embodiments according to the present invention will be further illustrated by way of a number of examples, the present invention not being limited thereto.

In a first aspect, the present invention relates to a stereoscopic imaging system for generating a stereoscopic image of a scene. The stereoscopic imaging system may be any system suitable for providing a stereoscopic image of a scene. The stereoscopic imaging system may be systems wherein the setup is such that different sub-images are spatially distinctive provided to the two eyes, such as e.g. in helmet mounted devices, virtual reality headsets or auto-stereoscopic display systems. Such systems are based on the principle that at least some of the sub-images are only displayed to one of the eyes and consequently can only be received by one of the eyes. A further example thereof is a system wherein a small imaging display is provided for each eye. The stereoscopic imaging system also may be based on time sequential provision of sub-images to the eyes, whereby the user is provided with an obscuration device influencing the way each eye sees the relevant image on the display. In these applications, different sub-images are provided subsequently for a fraction of time which are dedicated for left and/or right eye. The sub-images may for example be displayed using light with different optical properties and the obscuration device may be a passive obscuration means, i.e. non-switchable obscuration means, comprising filters such that different sub-images are received by each eye of the user. Another example is the use of an active obscuration means, i.e. a switchable obscuration means, wherein the different sub-images are modulated or transmitted or blocked for each eye differently. Examples of obscuration devices that can be used may be glasses or screens comprising liquid crystal shutters, opaque and transparent filters, polarisers, colour filters such as known red and green filters, etc. The obscuration device thereby is adapted to control which sub-image is seen by each eye.

The system may be adapted for providing a single stereoscopic image of a scene, but preferably is adapted for providing a plurality of stereoscopic images of a scene, e.g. moving stereoscopic images or video stereoscopic images. The stereoscopic imaging system is adapted for generating at least one sub-image for a left eye and at least one sub-image for a right eye, the different sub-images combining into the stereoscopic image.

The stereoscopic imaging system furthermore is adapted for generating image data for producing at least one of the sub-images for the left eye, the right eye or the left and the right eye based on a combination of basic image data for the left eye and basic image data for the right eye. The stereoscopic imaging system therefore comprises an image data processor for generating the image data. The image data thereby is adapted for imaging at least one sub-image to both the first eye and the second eye simultaneously, e.g. in number of frames provided, frame times provided with respect to the overall imaging time for imaging an image, imaged intensity as function of the image content to be displayed, etc. Basic image data for a given eye thereby is the image information corresponding with the image received by that eye when the scene is seen only by that eye. In other words, basic image data for the left eye is the image information corresponding with the image received by the left eye when the scene is seen by only the left eye and basic image data for the right eye is the image information corresponding with the image received by the right eye when the scene is seen by only the right eye. Expressed in a different way, the basic image data for a given eye corresponds with the image data for an image that one wants a person to see when a scene is seen by that person with the given eye only. It describes the basic image data for the given eye that the given eye would perceive in an ideal situation. The sub image for a given eye thus corresponds with the actual image data that is being used in for example the frame for a given eye of a conventional time sequential stereo display.

Standard and optional components of the stereoscopic imaging system according to an embodiment of the present invention are shown for an exemplary stereoscopic imaging system, the present invention not limited thereto. The stereoscopic imaging system 100 comprises imaging hardware 102, a controller 104 for controlling the imaging hardware 102 and an imaging data processor 106 for processing the overall image data input 108 thus generating image data for at least one of the sub-images 110 for the left eye, the right eye or the left and the right eye based on a combination of basic image data for the left eye and basic image data for the right eye.

Figure 2:
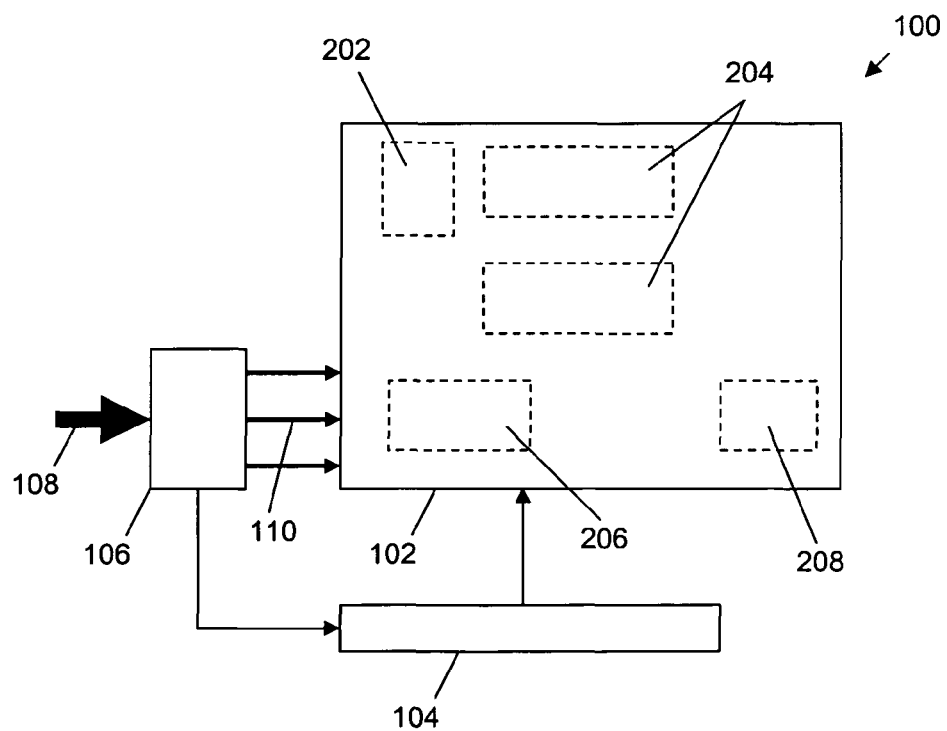
FIG. 2 is a schematic representation of a stereoscopic imaging system for use with an obscuration means, according to embodiments of the present invention.

Depending on the type of stereoscopic imaging technique used, the imaging hardware 102 may comprise different components. An overview of optional components is provided in FIG. 2. If e.g. a projector technique is used, the imaging hardware 102 may comprise one or more light sources 202, one or more projector devices or imaging panels 204, a modulator 206 and an external obscuration means 208. The light sources 202 may be white light sources or may be colour light sources. The light sources 202 may for example be short arc lamps or high pressure lamps, LEDs, etc. The one or more projector devices or imaging panels 204 may be a single chip projector or panel or a multiple chip projector or panel. It thus may comprise an image modulating panel or chip for inducing image information in an illumination beam. Such an image modulating panel or chip may be based on digital light processors such as for example digital mirror device or it may be for example a liquid crystal device. The projector(s) or imaging panel(s) 204 may alternate different sub-images with a sufficiently high refresh rate such that an appropriate refresh rate for the overall stereoscopic image is obtained. The modulator 206 may be adapted for selectively directing different images to either the left eye, or the right eye or to both the left eye and the right eye simultaneously. The modulator 206 may for example be any of a shutter or combination of shutters for transmitting or blocking predetermined sub-images to the left eye or the right eye or the left and the right eye, or a filter for selecting a light characteristic such that selection of the sub-image to be received can be based on such light characteristics, such as e.g. a colour filter, polarisation filter, intensity filter, etc. The modulator 206 also may for example be reflective and/or refractive optics for guiding light corresponding with given sub-images to the direction of the left eye, the right eye or to both the left eye and the right eye, or it may for example be a set of beam splitters combined with a shutter panel for guiding the light to a given direction. The obscuration means 208 does not need to be part of the stereoscopic imaging system. For auto-stereoscopic imaging techniques, the obscuration means is not required. The stereoscopic imaging system may be suitable for or adapted for operating with the obscuration means 208. The obscuration means 208 may be a passive or active obscuration means, depending on the imaging principle selected, i.e. it may be switchable or non-switchable. The obscuration means 208 may be a screen or glasses comprising filters for transmitting certain sub-images and blocking others, e.g. fixed filters. The filters may be based on colour filtering, polarisation filtering or amplitude filtering. The obscuration means 208 also may be based on shutters. The obscuration means 208 may be adapted for selectively blocking sub-images forming part of a stereoscopic image for one eye while transmitting it for the other and furthermore for selectively transmitting other sub-images forming part of the stereoscopic image to both eyes.

The controller 104 for controlling the imaging hardware 102 may be adapted for synchronising the image data processor 106 and the imaging hardware 102 such that the calculation of the image data is performed at appropriate moments. Synchronisation signals therefore may be provided. The controller furthermore may be adapted for controlling the synchronisation between different components of the imaging hardware 102 of the stereoscopic imaging system. E.g. in some embodiments synchronisation may be performed between the driving of the projector(s) or imaging panel(s) 204 and the modulator 206. In some embodiments synchronisation may also be performed between the modulator 206 and an active obscuration device, e.g. an external obscuration device that can be coupled to the controller for this synchronisation.

The image data that is generated by the image processor 106 may comprise a plurality of imaging parameters such as number of frames, frame times, image content, blanking times, frequency, etc. The image data thereby may be adapted for imaging at least one sub-image to both the first eye and the second eye simultaneously. The image data may for example be such that the image content within a frame to be imaged to both eyes or views simultaneously is not equally present in a further frame within the same frame sequence for generating a stereoscopic image.

The image processor 106 preferably receives an image input for generating an image to be displayed as a stereoscopic image. It may first calculate the basic image data for the left eye $L_T$ and the basic image data for the right eye RT. It may use this basic image data for calculating the different image frames, corresponding with different sub-images to be provided to the left and/or the right eye. Alternatively, the image processor may comprise a direct transformation for the image input into the image data for the different frames $F_1$, $F_2$, ... $F_n$. These different frames $F_1$, $F_2$, ... $F_n$ are imaged with fractions $f_1$, $f_2$, ... $f_n$, corresponding either with time fractions during which the frames are displayed, i.e. for time sequential stereoscopic imaging systems, and/or with parts of the total amount of light to be imaged that are used, i.e. for spatially distinctive stereoscopic imaging systems. The fractions also may express the fraction of light used having a specific light characteristic. The image processor preferably is adapted for deriving the different image frames $F_{l1}, F_{l2}$ ... $F_{li}$ imaged with a fraction $f_{l1}, f_{l2}$ ... $f_{li}$ to the left eye are such that the overall perceived image $L_p$ at the left eye is only a function $\Phi_l$ of the basic image data for the left eye $L_T$ and for deriving the different image frames $F_{r1}, F_{r2}$ ... $F_{ri}$ imaged with a fraction $f_{r1}, f_{r2}$ ... $f_{ri}$ to the right eye are such that the overall perceived image $R_p$ at the right eye is only a function $\Phi_r$ of the basic image data for the right eye $R_T$ $$L_p = f_{l1}\cdot F_{l1}(L_T,R_T) + f_{l2}\cdot F_{l2}(L_T,R_T) + \ldots + f_{li}\cdot F_{li}(L_T,R_T) = \Phi_l(L_T, R_T)$$

$$R_p = f_{r1}\cdot F_{r1}(L_T,R_T) + f_{r2}\cdot F_{r2}(L_T,R_T) + \ldots + f_{ri}\cdot F_{ri}(L_T,R_T) = \Phi_r(L_T, R_T)$$

According to the present invention, at least one of the image frames $F_{l1}, F_{l2}$ ... $F_{li}$ imaged with a fraction $f_{l1}, f_{l2}$ ... $f_{li}$ nevertheless comprises at least basic image data for the right eye $R_T$ and/or at least one of the image frames $F_{r1}, F_{r2}$ ... $F_{ri}$ imaged with a fraction $f_{r1}, f_{r2}$ ... $f_{ri}$ nevertheless comprises at least basic image data for the left eye $L_T$.

The image processor may be adapted for providing first frames to be imaged on only one eye and not on the other alternatingly with second frames to be imaged simultaneously on both eyes. The latter is advantageous in reducing flicker effects, as brightness jumps for individual pixels between the left and right view are avoided and a more gradual transition between the pixel values is obtained.

In certain embodiments, the image data processor 106 thereby may generate image frames wherein there is no immediate match anymore between the display pixels and the perceived pixels as one panel pixel may map to two spatially displaced perceived pixels when simultaneously generated to be received on the left eye and the right eye.

The image data processor 106 may comprise a memory, e.g. buffer memory for receiving image input in the form of signals from a signal source. The image data processor may be incorporated in any suitable programmable computing device such as personal computer with a Pentium IV microprocessor supplied by Intel Corp. USA, for instance, with memory and a graphical interface such as Windows XP as supplied by Microsoft Corp. USA. The image data processor may include a computing device, e.g. microprocessor, for instance it may be a micro-controller. In particular, it may include a programmable image data processor, for instance a programmable digital logic device such as a Programmable Array Logic (PAL), a Programmable Logic Array, a Programmable Gate Array, especially a Field Programmable Gate Array (FPGA). The use of an FPGA allows subsequent programming of the image data processor, e.g. by downloading the required settings of the FPGA. The image data processor 106 preferably has as an output the driving levels for driving the imaging hardware, and more particularly the image modulating panel(s) or chip(s), for generating the sub-images to be displayed.

The present invention will be further discussed by way of a number of particular embodiments, the present invention not being limited thereto, but only by the claims.

Figure 3:
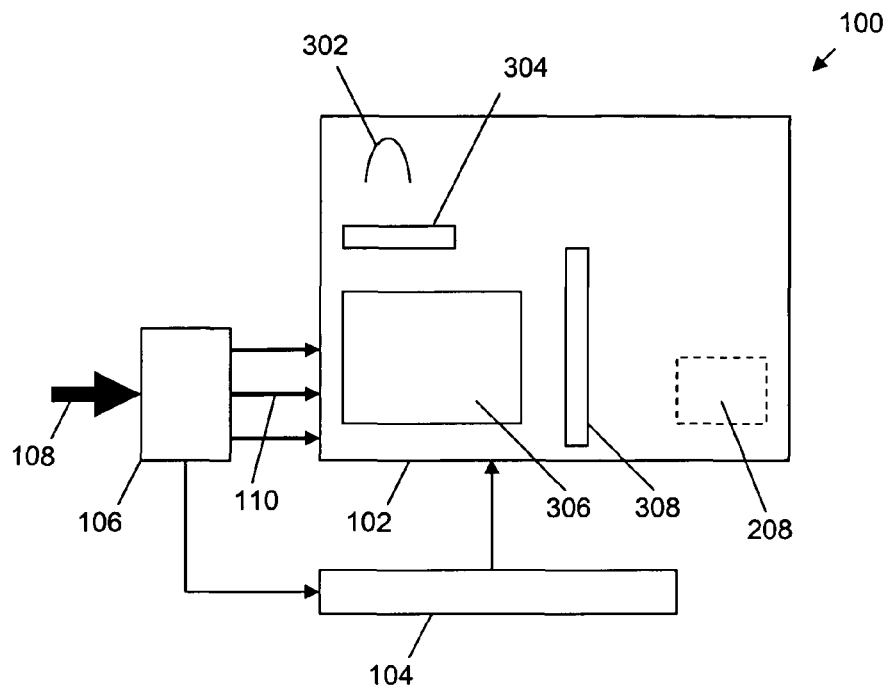
FIG. 3 is a schematic representation of a stereoscopic imaging system based on a colour wheel according to an example of an embodiment of the present invention.
Figure 4:
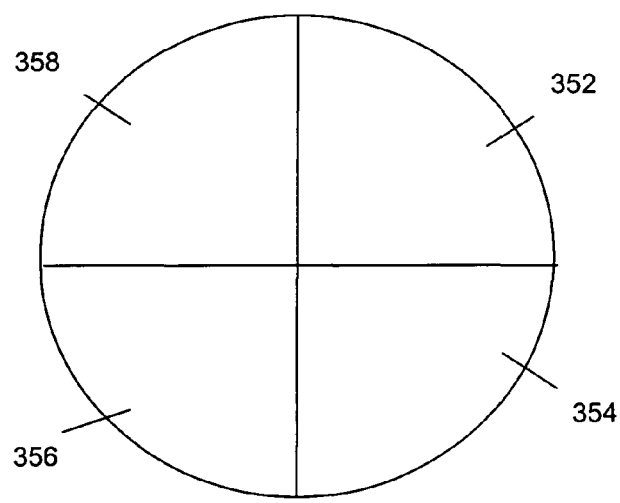
FIG. 4 is a schematic representation of a colour wheel that can be used in a system as illustrated in FIG. 3.

In a first particular embodiment, the present invention relates to a stereoscopic imaging systems as described above, wherein the stereoscopic imaging system is adapted for generating in time a sequence of different sub-images comprising at least one sub-image generated on image data based on a combination of basic image data for the left eye and basic image data for the right eye. By way of example, a schematic overview of such a system is shown in FIG. 3. The imaging hardware 102 of the present embodiment comprises a light source 302 and a projector comprising a image modulating panel 304 and projection optics 306 adapted for providing in a time sequential manner sub-images for left and/or right eye and a modulator 308 for sequentially modulating the light used for generating the image to be received by the left and/or right eye distinctively. The imaging hardware 102 thereby may be adapted to provide not only a time sequential channel for providing light to be received only by the left eye or only by the right eye, but also to provide, for generating the stereoscopic image, a separate channel for providing light simultaneously to both the left eye and the right eye. Such a separate channel may in one example of the present embodiment be constructed by providing a time sequential modulator being a filter in the optical path of the radiation beam for distinctively in time obtaining first light with a first characteristic for generating at least one sub-image for the left eye, for distinctively in time obtaining second light with a second characteristic, different from the first characteristic, for generating at least one sub-image for the right eye, and for distinctively in time obtaining third light for generating at least one sub-image to be received by both the left eye and the right eye simultaneously. The filter may e.g. be a rotating filter wheel, as e.g. shown in FIG. 4, or filter strip comprising different portions which are brought in the light path in a time sequential manner. The first light with a first characteristic can be obtained using a first filter portion of the filter in the light path. The second light with a second characteristic can be obtained using a second filter portion of the filter in the light path. One of the first light or the second light may be generated by the absence of a filter portion in the light path. The filtered characteristic may be any suitable characteristic for generating light that can be distinctively received such as for example a colour characteristic, an amplitude characteristic or a polarisation characteristic. For example, the generated sub-images may be time sequentially imaged with red light, green light and a combination of green light, or with red light, green light and blue light, or with horizontal polarised light, vertical polarised light an a combination of horizontal and vertical polarised light. By way of illustration, the filter wheel of FIG. 4 comprises in the first quadrant 352 and the third quadrant 356 a filter allowing passage of light both to the left and the right eye, whereas the filter wheel comprises in a second quadrant 354 a filter for passing light only to the left eye and in a fourth quadrant 358 a filter for passing light only to the right eye. According to the present embodiment, the filter present in the optical path thus is adapted for providing at least one sub-image simultaneously to both the left eye and the right eye. Providing the at least one sub-image simultaneously may be done intentionally. The stereoscopic imaging system then is suitable for use with a passive obscuration means, wherein the obscuration means further filter the first light and second light to be discriminated by the left eye respectively the right eye, and whereby the third light is visible to both eyes. In other words, the third light, i.e. the light used in the separate channel for providing light simultaneously to both the left eye and the right eye may comprise light having the first characteristic and light having the second characteristic or may have a third characteristic whereby the obscuration means is adapted such that both the left eye and the right eye can receive light with the third characteristic. Such an obscuration system thus may be a pair of glasses or a filtering screen, allowing to transmit the first light with the first characteristic for the left eye, the second light with the second characteristic for the second eye and the third light for both eyes.

In another example of the present embodiment, no modulator for providing a specific characteristic to the light used for the different sub-images is required at the projector/imaging side, but the system is suitable for use with an active obscuration means by the viewer, whereby the active obscuration means is a shutter for selectively passing at least one sub-image to the left eye or right eye, and for passing the sub-images to be received by the left eye and the right eye simultaneously to both the left eye and the right eye. Synchronisation between the imaging hardware providing the time sequential sub-images and the active obscuration means then preferably is provided.

It is an advantage of embodiments according to the present invention that only a single image modulating chip, also referred to as image modulating panel, is required for inducing the image information, while still a substantially high brightness can be obtained. Furthermore the occurrence of flicker may be substantially reduced.

In a second particular embodiment, the present invention relates to a stereoscopic imaging system as described in the first embodiment, wherein the imaging hardware comprises at least two projectors or imagers, for projecting the light for the left eye and the light for the right eye simultaneously. One of the projectors then may generate the sub-images for the right eye only and one of the projectors then may generate the sub-images intended for the left eye only. The sub-images to be received by both the left eye and the right eye may be produced either by both of the above mentioned projectors, or by a further projector. Filtering at the viewers side may be performed as described in the first example of the filter described in first embodiment. Alternatively, instead of projectors, separate imagers may be used for the left eye and the right eye that are only selectively visible by the left and the right eye by virtue of their position, e.g. in helmet mounted systems, such that no filtering is required at the viewer's side. It is an advantage of such systems that the brightness can be increased, as e.g. by using left and right image data in both projectors, light with a characteristic used in the first projector or imager and light with a characteristic used in the second projector or imager can be used for both left and right image data. An example thereof is a two projector stereoscopic display system with passive glasses, e.g. polarisation based. One projector will for example generate light with one polarization direction, to be received by the left eye. The second projector then will generate light with the perpendicular polarization direction, to be received by the right eye. According to this embodiment of the present invention, a frame is introduced in both projectors that contains the "joint left/right image" whereby there is no need anymore to polarize the light at the projector side and thus the luminance of that frame is doubled.

Figure 5:
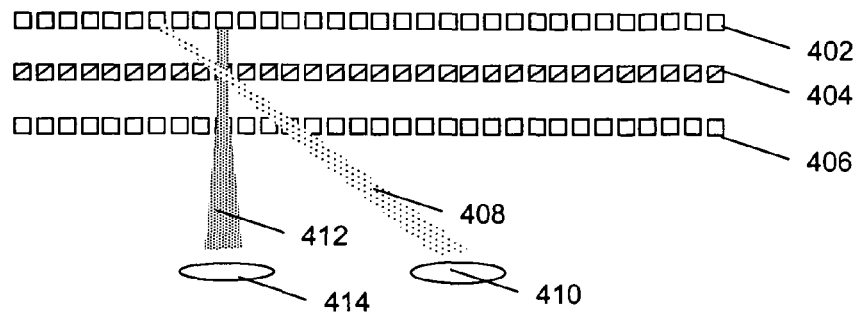
FIG. 5 is a schematic representation of part a stereoscopic imaging system based on directional imaging of sub-images according to an embodiment of the present invention.

In a third particular embodiment, the present invention relates to a stereoscopic imaging system as described above, wherein the sub-images to be received by the left and/or right eye are produced in a time sequential manner, and wherein these sub-images are guided to the left eye only, the right eye only or a combination of both the left eye and the right eye. The system is suitable for helmet mounted applications. The imaging hardware therefore comprises a light source or backlight 402, an array of beam splitters 404 for directing light from the backlight in first directions and second directions, different from the first directions and a modulating panel 406 for selectively transmitting or blocking the directed light. The backlight 402 and the modulating panel 406 thereby are synchronised to sequentially generate at least one sub-image 408 for the right eye 410 only, one sub-image 412 for the left eye 414 only and, according to an embodiment of the present invention, to both the left eye and the right eye simultaneously and to direct the generated light in either direction of the left eye only, direction of the right eye only or direction of both eyes simultaneously. The latter is illustrated by way of example in FIG. 5.

In a fourth particular embodiment, the present invention relates to a stereoscopic imaging system as described above, but wherein the stereoscopic imaging system is adapted for spatially distinctive generating a plurality of sub-images for left eye or right eye to combine into the stereoscopic image, said plurality of sub-images comprising at least one sub-image to be received by both said left eye and said right eye simultaneously. The stereoscopic imaging system may comprise a separate channel for providing a sub-image simultaneously to both the left eye and the right eye. One example thereof are monochrome displays typically used in medical applications. These displays often are colour displays where the colour filters have been removed. Therefore each "pixel" consists of three monochrome sub pixels. In this situation it is easily possible to put a lens over two of the three sub pixels to generate the light of one sub pixel to the left eye, of another sub pixel to the right eye. Because there is no lens on top of the third sub pixel, that sub pixel will have its normal (quasi lambertian) radiation/emission pattern and therefore its light will end up in both left and right eye. As also will be set out further, instead of a fixed lens it is also possible to use switchable lenses, in that case there can be a lens over all three sub pixels but one of the three can be off (and the pixel for which the lens is of can be modulated over time).

Figure 6:
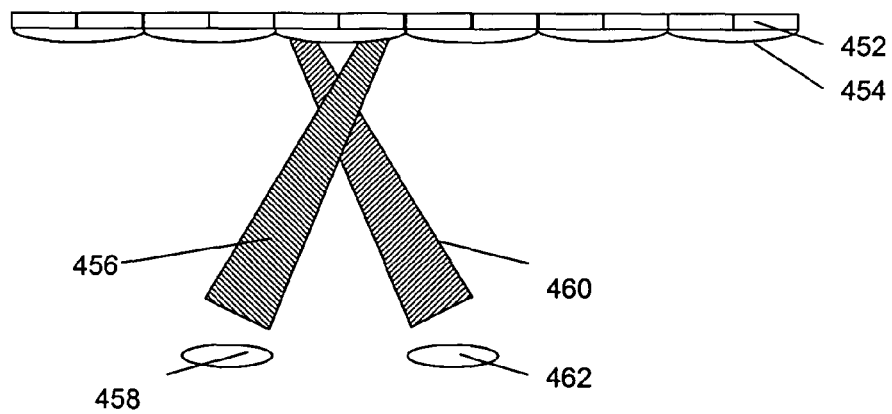
FIG. 6 is a schematic representation of part of a lenticular based imaging system as known from prior art.
Figure 7:
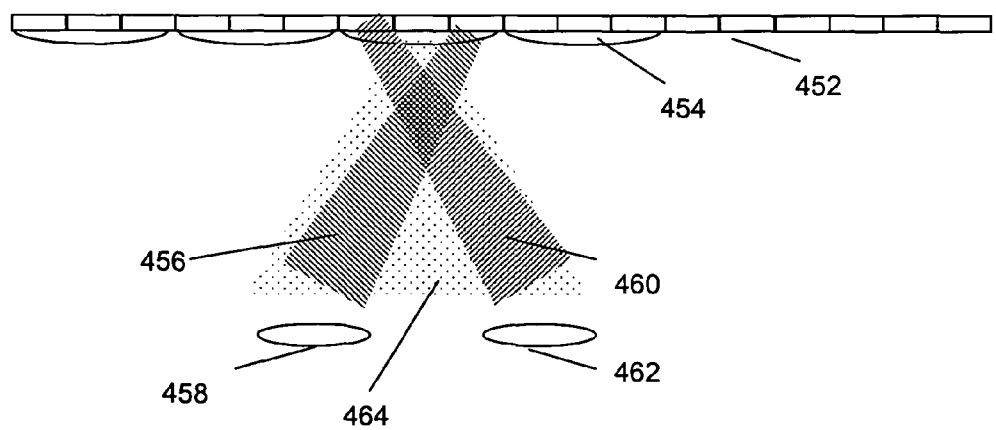
FIG. 7 is a schematic representation of part of a lenticular based imaging system according to an embodiment of the present invention.

The system thus may be adapted to at first locations generate a sub-image for the left eye only, at second locations generate a sub-image for the right eye only and at third locations generate a sub-image for both eyes simultaneously. The generated images may either be generated with or filtered to light having a specific characteristic, such that it can be detected by the left and/or right eye distinctively. Such filtering may be performed using a method as for example described in the first example of the first particular embodiment, the present invention not being limited thereto. The stereoscopic imaging system may be for example a lenticular stereoscopic system, although the invention is not limited thereto. A lenticular stereoscopic system as known in the prior art is shown in FIG. 6 whereas a lenticular stereoscopic system according to an embodiment of the present invention is shown in FIG. 7. The stereoscopic imaging system then may comprise a display panel 452 and a lenticular mask 454 for directing light beams constituting different sub-images in different directions. The lenticular mask thereby is adapted for receiving light from the display panel and for spatially distinctive obtaining not only first light 456 to be received only by the left eye 458 and second light 460 to be received only by the right eye 462 (as in prior art, FIG. 6) but also third light 464 to be received by both the left eye 458 and the right eye 462. The first light, second light and third light may correspond with different sub-images which may be displayed simultaneously but spatially distinct by the display panel. In other words, the lenses provided by the lenticular mask are adapted for directing part of the light only in a first direction, part of the light only in a second direction and part of the light both in the first and the second direction. It thereby is an advantage of the present invention that a lenticular stereoscopic image can be obtained with high brightness, e.g. with a brightness being 33% larger than the brightness obtained with conventional stereoscopic imaging systems. The lenticular mask therefore may comprise a first set of lenses for directing part of the light corresponding with one sub-image to the left eye, a second set of lenses for directing part of the light corresponding with one sub-image to the right eye and a third set of lenses for imaging a sub-image onto both the left eye and the right eye. The latter thus generates an additional channel having a field of view that is joint for the left and the right eye.

Alternatively, the lenticular mask may also be used in a time sequential way of displaying the sub-images and therefore the lenticular mask may comprise at least one set of settable lenses, wherein the lenses, i.e. lenses that comprise switchable focussing conditions. The settable lenses may be fluid lenses. The settable lenses may be made of electro-refractive materials and settable by applying an electromagnetic field. The settable lenses may be fluid lenses. The settable lenses may e.g. be driven to guide the light subsequently in a first direction for the light to be received by the left eye, a second direction for the light to be received by the right eye and a third direction for the light to be received by both the left eye and the right eye simultaneously.

In a further particular embodiment, the present invention relates to a stereoscopic imaging system as described above, wherein the imaging data processor 106 is adapted for generating image data for producing at least one of the sub-images based on a combination of basic image data for the left eye and basic image data for the right eye. The imaging data processor 106 thereby is adapted to take into account the unintentional cross-talk of sub-images incident on one eye while intended to only be received by the other eye.

In one embodiment according to the present invention, use of the generation of image data based on both basic image data for the left eye and basic image data for the right eye may be made selectable, depending on the image content, thus resulting in a guaranteed very high quality imaging. The latter can for example be based on the human visual system and its possibility to perceive brightness. The brightness perception of the human visual system is not perfect and effects as bloom and flare lines may be present. In the case of bloom for example, light from a light source A scatters may scatter inside the eye onto the same receptors as if coming from source B, thus adding effective luminance. To take this effect into account a point spread function $P(\alpha)$ for the bloom effect may be used. The latter is described in more detail in "A High Dynamic Range Display Using Low and High Resolution Modulators" by Helge Seetzen et al. in SID 03 Digest P.54.2. Taking into account such a model it is possible to approximate the perceived luminance pattern and to estimate the amount of perceived blur by the human vision system. Whether or not generation of image data based on both basic image data for the left eye and the right eye is used may depend on a comparison of the estimated perceived blur and possible image degradation obtained by applying the technique according to the present invention to high frequency content with strongly different average brightness between left and right image. For example, the technique may be applied as long as the possible image degradation is smaller than the perceived blur.

In a second aspect, the present invention relates to a method for generating a stereoscopic image. The method comprises receiving an image input for a scene to be imaged and calculating image data for sub-images to be displayed to the left eye and/or the right eye, wherein calculating image data for the sub-images comprises producing at least one sub-image for the left eye and/or for the right eye generated based on a combination of the basic image data for the left eye and the basic image data for the right eye. The basic image data for the left eye thereby is the image information corresponding with the image received by the left eye when the scene is seen by the left eye only and the basic image data for the right eye being the image information corresponding with the image received by the right eye when the scene is seen by the right eye only. The method furthermore comprises projecting or imaging the sub-images to the left eye, the right eye or the left and the right eye. The method comprises imaging at least one sub-image, corresponding with at least one image frame to both the left eye and the right eye simultaneously. The image data therefore is adapted for imaging at least one sub-image to both the left eye and the right eye simultaneously, e.g. as indicated above. For projecting or imaging, the method may comprise driving the image modulator panel or chip according to the image data calculated for the sub-images and directing the obtained sub-images to the left eye, the right eye or the left and the right eye. The method furthermore may comprise synchronising the driving and the directing such that each sub-image is directed to the eye or eyes for which they are intended. Directing the obtained sub-images to the left eye, the right eye or the left and the right eye may be performed by the use of different lenses, by the use of filters whereby light with different characteristics is used for selectively allowing the light to the appropriate eye or eyes, by using shutters for transmitting the sub-images to be imaged to a given eye and blocking the sub-images not to be imaged to the given eye, by use of a modulating screen for selectively transmitting certain light beams and blocking others etc. The specific technique used depends on the principle used for imaging. In one embodiment, the method may comprise sending first sub-images to the left eye or the right eye only and sending second sub-images to both the left eye and the right eye simultaneously, whereby first sub-images and second sub-images are alternatingly imaged. The method preferably is performed using a stereoscopic imaging system as described in the first aspect, although the invention is not limited thereto.

In a third aspect, the present invention relates to an image processor as such for generating image data for obtaining at least one stereoscopic image. The image processor thereby is adapted for generating image data for at least one sub-image of a sequence of sub-images for generating a stereoscopic image based on a combination of the basic image data for the left eye and the basic image data. The image data thereby is adapted for imaging at least one sub-image to both the first eye and the second eye simultaneously. The image data may for example be such that the image content within a frame to be imaged to both eyes or views simultaneously is not equally present in a further frame within the same frame sequence for generating a stereoscopic image. The basic image data for the left eye thereby is the image information corresponding with the image received by the left eye when the scene is seen by the left eye only and the basic image data for the right eye being the image information corresponding with the image received by the right eye when the scene is seen by the right eye only. In other words, the basic image data corresponds with the image data used in conventional stereoscopic systems, whereby the image data is based on a full separation of the images theoretically to be received by the left eye and the right eye. The image processor preferably is adapted for generating image data as set out in the first aspect. It is suitable for operating in a stereoscopic imaging system as set out in the first aspect according to the present invention. Further features and advantages are as described for the image data processor 106 in the first aspect.

In a fourth aspect, the present invention also relates to an obscuration device as described in the first aspect. The obscuration means may be adapted for selectively blocking sub-images for forming part of a stereoscopic image for one eye while transmitting it for the other and furthermore for selectively transmitting other sub-images forming part of the stereoscopic image to both eyes. It may be an active or passive obscuration device, depending on the stereoscopic imaging principle used, i.e. it may be switchable or non-switchable. The obscuration means may be a screen or glasses comprising filters for transmitting certain sub-images and blocking others, e.g. fixed filters. The filters may be based on colour filtering, polarisation filtering or amplitude filtering. The obscuration means 208 also may be based on shutters. It may be adapted for, during part of the imaging, having both the shutter for the left eye and the shutter for the right eye open simultaneously. Further features and advantages are as described in the above aspects.

In a fifth aspect, the present invention also relates to part of the stereoscopic imaging system as described in the first aspect, more particularly to part or all of the imaging hardware as described in the first aspect, allowing to select and direct sub-images for making a stereoscopic image simultaneously to both the left eye and the right eye, while imaging other sub-images only to one of the eyes. The part of the imaging hardware may be, instead of sequentially creating a view only for the left and right eye, also create a joint channel for view by both the left and right eye simultaneously. For example, in a first phase a pure left channel can be created, furthermore a joint channel can be created and in a third phase a pure left channel can be created. The imaging hardware may be imaging hardware for time sequentially providing stereoscopic images or for spatially distinctive generating stereoscopic images. It may for example relate to the modulator adapted for selecting and directing a sub-image simultaneously to both eyes such that it can be received by both eyes as well as selecting and directing a sub-image only to one of the eyes. It may for example also relate to a lenticular mask adapted for spatially distinctive generating first light to be received only by the left eye, second light to be received only by the right eye and third light to be received by both the left eye and the right eye. Such a lenticular mask may e.g. comprise a first set of lenses for imaging onto the left eye, a second set of lenses for imaging onto the right eye and a third set of lenses for imaging onto both the left eye and the right eye.

In a sixth aspect, the present invention also relates to a controller for controlling the imaging hardware as described in the first aspect of the present invention. The controller may be implemented in a processing system which may e.g. include at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them.

The present invention also includes a computer program product which provides the functionality of any of the methods for controlling an imaging system and/or for generating image data for generating a stereoscopic image according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is an advantage of embodiments according to the present invention that stereoscopic images can be generated and/or projected with a high brightness. The brightness increase can be 33% or more, or even 50% or more up to 100% compared to conventional stereoscopic imaging systems. It thereby is an advantage that no stronger light sources or backlights are required, resulting in a reduction in cost, a reduction of heating problems, etc.

By way of illustration, the present invention not being limited thereto, the invention is illustrated by a number of examples, illustrating some advantages and aspects of embodiments of the present invention.

In a first example, multiplexing based on 3 frames is performed. In other words, the total image content to be perceived is spread over three frames, i.e. first frame $F_1$, second frame $F_2$ and third frame $F_3$. The theoretical image content for the left eye $L_T$ and the theoretical image content for the right eye $R_T$ to be displayed in stereoscopic imaging is distributed over the three subsequent frames as follows:

$$F_1 = L_T - \frac{R_T}{2}$$

$$F_2 = \frac{L_T + R_T}{2}$$

$$F_3 = R_T - \frac{L_T}{2}$$

The perceived image content for the left eye $L_p$ and the perceived image content for the right eye $R_p$ then become $$L_p = \frac{1}{3} \cdot \left( L_T - \frac{R_T}{2} \right) + \frac{1}{3} \left( \frac{L_T + R_T}{2} \right) = \frac{2}{3} L_T$$

$$R_p = \frac{1}{3}\left(\frac{L_T + R_T}{2}\right) + \frac{1}{3} \cdot \left(R_T - \frac{L_T}{2}\right) = \frac{2}{3}R_T$$

In standard stereoscopic imaging, wherein the theoretical image content for the left eye $L_T$ and the theoretical image content for the right eye $R_T$ is alternatingly imaged to the left eye and right eye respectively, the perceived image intensity after a full image stereoscopic image is displayed is given by $$L_p = \frac{1}{2}L_T$$

$$R_p = \frac{1}{2}R_T$$

Comparing the perceived image intensity for the left and right eye between the present example and the standard stereoscopic imaging indicates that the obtained brightness is 33% larger for the stereoscopic displaying method according to an embodiment of the present invention, i.e.

$$\text{Gain for left eye}: \frac{\frac{2}{3}L_T}{\frac{1}{2}L_T} = \frac{4}{3}L_T$$

$$\text{Gain for right eye}: \frac{\frac{2}{3}R_T}{\frac{1}{2}R_T} = \frac{4}{3}R_T$$

In other words, it can be seen that compared to the conventional stereoscopic imaging technique whereby left and right eye image is displayed in subsequent frames an enhanced brightness is obtained.

As can be seen it is possible that in the first frame $F_1$ and the third frame $F_3$ some pixels need to be assigned "negative" pixel values. Of course this is physically not possible. In such situation an approach can be applied such as described by Seetzen et al. in SID 03 Digest P.54.2 and/or as described above with respect to making the use of joint image data for each eye dependent on the image content.

In a second example, multiplexing based on 3 frames is performed, whereby a different distribution of the basic image data is made. The total image content to be perceived is spread over three frames, i.e. first frame $F_1$, second frame $F_2$ and third frame $F_3$. The theoretical image content for the left eye $L_T$ and the theoretical image content for the right eye $R_T$ to be displayed in stereoscopic imaging is distributed over the three subsequent frames as follows:

$F_1 = L_T - R_T + a$ $F_2 = R_T - a$ $F_3 = a$ and the first frame is imaged to the left eye only, the second frame is imaged to both the left eye and the right eye simultaneously whereas the right eye is shown to the right eye only. It can be seen that the latter provides an additional degree of freedom for generating the image data for the sub-images for creating the stereoscopic image. This additional degree of freedom can for example be used to avoid that some pixels need to be driven with a "negative" pixel value, which is physically not possible. The values for data a can e.g. be selected such that no negative pixel value occurs in any of the frames.

In a third example, the total image content to be perceived is spread over five frames, i.e. first frame $F_1$, second frame $F_2$, third frame $F_3$, fourth frame $F_4$ and fifth frame $F_5$. The theoretical image content for the left eye $L_T$ and the theoretical image content for the right eye $R_T$ to be displayed in stereoscopic imaging is distributed over the three subsequent frames as follows:

$F_1 = a$ $F_2 = b$ $F_3 = L_T - a - b$ $F_4 = R_T - c + a + b - L_T$ $F_5 = c$

The first, third and fifth frame then may be imaged simultaneously to the left eye and the right eye, whereas the second frame is imaged only to the left eye and the fourth image is only imaged to the right eye. The latter provides three additional degree of freedom for generating the image data for the sub-images for creating the stereoscopic image by having selectable values for data a, b and c. This additional degrees of freedom can for example be used to avoid that some pixels need to be driven with a "negative" pixel value, which is physically not possible. The values for data a, b and/or c can e.g. be selected such that no negative pixel value occurs in any of the frames.

Figure 8:
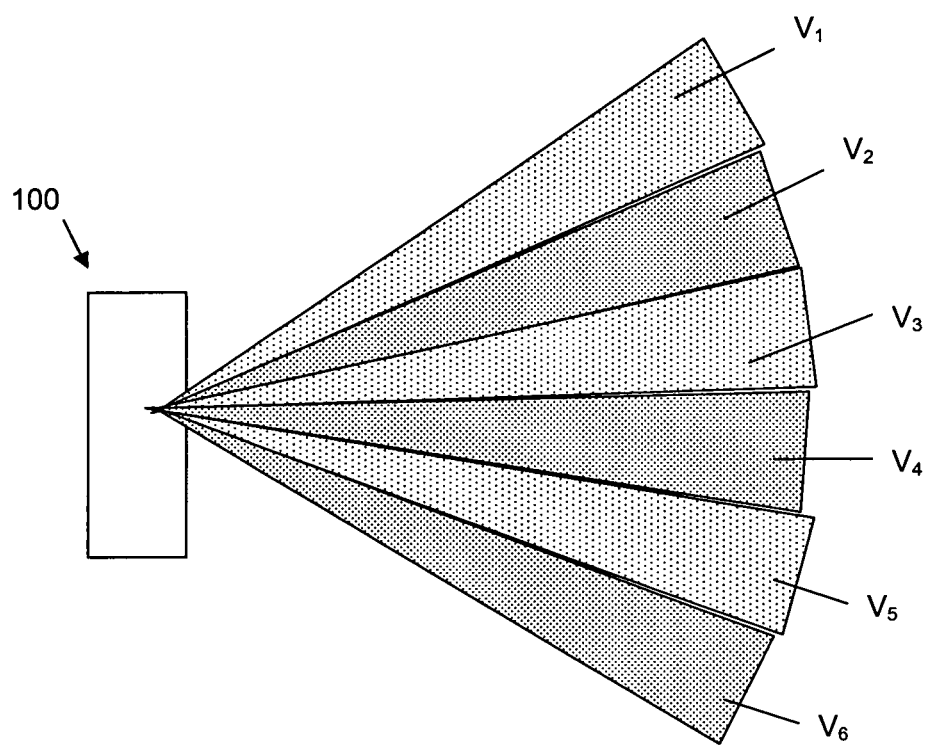
FIG. 8 illustrates a schematic representation of an exemplary system of a multi-view system with more than 2 views, according to an embodiment of the present invention.

A fourth example illustrates some advantages and principles of embodiments as described above for a six view stereo display system, wherein six different views are generated in different zones from where the multi-view display system is used by a user. An example of such a system is shown by way of illustration, the invention not being limited thereto, in FIG. 8. The six view stereo display system 100 is adapted for providing sets of a left view and right view. Six different views, i.e. places from where different images can be received, are provided, i.e. V1, V2, V3, V4, V5 and V6. More generally, although the invention is not limited thereto, the selection between left and right eye sub-images appointed to different views may be dynamically assigned to the available views of the stereoscopic display. In other words a dynamic set of a left and right view may be selected using e.g. two of the available views, advantageously two neighbouring available views. A user may be tracked, e.g. using a detector such as e.g. a head tracker. Based on the tracking information, the system may be driven such that always a left eye sub image is sent to the user's left eye and a right sub image to the user's right eye. The latter is advantageous to improve the viewing comfort of the user for viewing the scene. Consequently in the above described example, for a user moving from the top (first view) to the bottom (sixth view), the selection of left and right view preferably are dynamically adapted as follows:

| First | V1 = left view | V2 = right view |
|---|---|---|
| Then | V2 = left view | V3 = right view |
| Then | V3 = left view | V4 = right view |
| Then | V4 = left view | V5 = right view |
| Then | V5 = left view | V6 = right view. |

Alternatively to the dynamic adaptation based on tracking, the system also may be provided as three spatially static sets of left/right views for generating stereoscopic view wherein the sets are fixed, but the invention is not limited by the number of sets. For each of the sets the stereoscopy methods as described above may be applied. With reference to the present example, the sets may e.g. be a first set of V1 and V2, a second set of V3 and V4 and a third set of V5 and V6.

Furthermore, for dynamically altered sets as well as for spatially static sets, if a plurality of frames is used for obtaining the views, the number of frames and the number of joint or common frames imaged to different views may be selected differently for each set or group of views. For example, the scheme used for the central set, i.e. second set with views V3 and V4 can be a scheme using three frames, as set out in the first and second example, and the scheme used for the first set and third set can be a four frame or five frame based driving scheme, an example thereof being provided in the third example. For example for a dynamic variable set, the scheme used at one moment may be replaced by a scheme used at another moment, dependent or independent of the place of the user and the actual views used in the dynamic variable set.

Furthermore, the technique and/or system used for generating the sub-images for the different sets may be different, although alternatively the same technique and/or the same system may be used. It is an advantage of such multi-view systems that the stereoscopic image may be adapted depending on the angle from which the scene is seen, resulting in an improved three dimensional view experience, even if a user moves with respect to the scene to be seen. Furthermore, if a joint channel is used for providing basic image data of different views to different views, such a joint channel may be common for an arbitrary number of views and is not restricted to views in a single set. A joint channel may thus be provided to at least two views. Furthermore, the number of views to which the joint channel is imaged can vary over time. Furthermore, a joint channel does not need to be imaged to views that are adjacent, e.g. a joint channel can e.g. be imaged to the first view, fourth view and fifth view of the example described above, nor does a joint channel need to be imaged to both left and right view of a set or a plurality of sets. A joint channel thus does not need to be imaged per set. The selection of which view receives the image of a joint channel may be performed in any suitable way with the methods as described above, e.g. by selecting the directions in which the image of the joint channel is displayed, etc. There furthermore can be more than one joint channel, i.e. a plurality of joint channels. The different joint channels can be furthermore overlapping.

In a further example—by way of illustration, the invention not limited thereto—, a system using five views $V_1, V_2, V_3, V_4$ and $V_5$ is disclosed, wherein a first joint channel $J_1$ is provided to $V_1$ and $V_5$. $V_1$ and $V_5$ thereby can be for example a left view and right view, a right view and left view, a left view and left view or a right view and right view. Furthermore, a second joint channel $J_2$ also can be provided to $V_1$ and $V_2$. Some time later, the system may provide only one joint channel J providing an image to $V_3$ and $V_5$, i.e. such that e.g. in $V_1$ no joint image information is provided anymore. More in general, the imaging of basic image data of different views may be selectively provided to certain views and not to others. The providing of basic image data of different views to predetermined views may be altered as function of time, e.g. dependent on the image content or dependent on imaging factors.

It is to be understood that although preferred embodiments, specific constructions and configurations, as well as materials, have been discussed herein for devices according to the present invention, various changes or modifications in form and detail may be made without departing from the scope of this invention as defined by the appended claims. For example, any formulas given above are merely representative of procedures that may be used. Functionality may be added or deleted from the block diagrams and operations may be interchanged among functional blocks. Steps may be added or deleted to methods described within the scope of the present invention. Whereas the methods and systems have been described mainly for three different frames, the method and system also can be applied for more than three frames.

The invention claimed is:

1. A stereoscopic imaging system for generating a stereoscopic image of a scene, the stereoscopic imaging system being configured to generate at least one sub-image for a first eye, at least one sub-image for a second eye and at least one common sub-image for said first eye and said second eye, said at least one sub-image for the first eye, at least one sub-image for the second eye and at least one sub-image for both eyes being configured to be combined into the stereoscopic image, wherein the system comprises:
an image data processor configured to generate image data for producing at least one of said sub-images for the first eye and/or for the second eye based on a combination of the basic image data for the first eye and the basic image data for the second eye, wherein the image data is configured to image at least one sub-image to both the first eye and the second eye simultaneously,
the basic image data for the first eye being the image information received by the first eye when the scene is seen by the first eye only and the basic image data for the second eye being the image information received by the second eye when the scene is seen by the second eye only,
wherein the stereoscopic imaging system is configured to image at least one of said at least one sub-image, generated based on a combination of the basic image data for the first eye and the basic image data for the second eye, simultaneously to both the first eye and the second eye.

2. A stereoscopic imaging system according to claim 1, wherein the stereoscopic imaging system is configured to generate in time a sequence of different sub-images for first or second eye to combine into the stereoscopic image, said sequence comprising said at least one of said at least one sub-image.

3. A stereoscopic imaging system according to claim 1, wherein the stereoscopic imaging system comprises at least one projector and a filter in the optical path that generates sub-images to combine into the stereoscopic image, the filter configured to distinctively obtain first light with a first characteristic generating at least one sub-image for the first eye and distinctively obtain second light with a second characteristic, different from the first characteristic, generating at least one sub-image for the second eye, the filter furthermore being configured to distinctively obtain third light generating said least one of said at least one sub-image to be received by both the first eye and the second eye simultaneously.

4. A stereoscopic imaging system according to claim 3, wherein the third light comprises both light comprising the first characteristic and light comprising the second characteristic.

5. A stereoscopic imaging system according to claim 3, wherein the first and second characteristics are one of colour characteristics, amplitude characteristics or polarisation characteristics.

6. A stereoscopic imaging system according to claim 1, wherein the stereoscopy system furthermore comprises active shutters, the active shutters being configured to selectively pass at least one sub-image to the first eye or second eye, and to simultaneously pass to both the first eye and the second eye said at least one sub-image to be received by the first eye and second eye simultaneously.

7. A stereoscopic imaging system according to claim 1, wherein the stereoscopy system furthermore comprises a backlight, an array of beam splitters directing light from said backlight in first directions and second, different, directions and a modulating panel selectively transmitting or blocking the directed light, the backlight, array of beam splitters and modulating panel being synchronised to sequentially generate a sub-image directed to the first eye and a sub- image directed to the second eye, the backlight, array of beam splitters and modulating panel furthermore being synchronised to generate the at least one sub-image to be received by both the first eye and the second eye simultaneously and to direct it to both the first eye and the second eye simultaneously.

8. A stereoscopic imaging system according to claim 1, wherein the stereoscopic imaging system is configured to perform spatially distinctive generation of a plurality of sub-images for a first eye or second eye to combine into the stereoscopic image, said plurality of sub-images comprising at least one sub-image to be received by both said first eye and said second eye simultaneously.

9. A stereoscopic imaging system according to claim 1, wherein the stereoscopic imaging system comprises a display panel and a lenticular mask, the lenticular mask being configured to receive light from the display panel and to spatially distinctly obtain first light to be received only by the first eye, second light to be received only by the second eye and third light to be received by both the first eye and the second eye.

10. A stereoscopic imaging system according to claim 1, wherein said combination of substantially the basic image data for the first eye and substantially the basic image for the second eye is selected as function of the unintentional cross-talk obtained in a sub-image generated based on only said basic image data for the first eye and/or the unintentional cross-talk obtained in a sub-image generated based on only said basic image data for the second eye.

11. An image processor for generating image data for obtaining at least one stereoscopic image, wherein the image processor is configured to generate image data for at least one sub-image of a sequence of sub-images that generates a stereoscopic image based on a combination of the basic image data for the first eye and the basic image data for the second eye, wherein the image data is configured to image at least one sub-image to both the first eye and the second eye simultaneously, the basic image data for the first eye thereby is the image information corresponding with the image received by the first eye when the scene is seen by the first eye only and the basic image data for the second eye being the image information corresponding with the image received by the second eye when the scene is seen by the second eye only, wherein the image processor is configured to provide the generated image data that images the at least one sub-image to both the first eye and the second eye simultaneously.

12. An obscuration device configured to be used with the stereoscopic imaging system recited in claim 1, wherein the obscuration device is configured to selectively block sub-images forming part of a stereoscopic image for one eye while transmitting it for the other eye and to selectively transmit other sub-images forming part of the stereoscopic image simultaneously to both eyes.

13. An imaging method for providing a stereoscopic imaging technique of a scene, the method comprising;

receiving an image input for a scene to be imaged, calculating image data for sub-images to be displayed to the first eye and/or the second eye, wherein calculating image data for the sub-images comprises producing at least one sub-image for the first eye and/or for the second eye generated based on a combination of the basic image data for the first eye and the basic image data for the second eye, wherein the image data is configured to image at least one sub-image to both the first eye and the second eye simultaneously, the basic image data for the first eye thereby being the image information corresponding with the image received by the first eye when the scene is seen by the first eye only and the basic image data for the second eye being the image information corresponding with the image received by the second eye when the scene is seen by the second eye only, and imaging at least one of the at least one sub-image, generated based on a combination of the basic image data for the first eye and the basic image data for the second eye, simultaneously to both the first eye and the second eye.

14. A method according to claim 13, wherein the at least one sub-image is imaged simultaneously to both the first eye and the second eye by driving an image modulator panel or chip according to the image data calculated for the at least one sub-image and directing the at least one sub-image simultaneously to both the first eye and the second eye.

15. A controller configured to control the stereoscopic imaging system recited in claim 1.

* * * * *